United States Patent
Lopez Ruiz et al.

(10) Patent No.: US 11,436,192 B2
(45) Date of Patent: Sep. 6, 2022

(54) SYSTEM AND METHOD FOR INTEGRATING MESSAGE CONTENT INTO A TARGET DATA PROCESSING DEVICE

(71) Applicant: Amadeus S.A.S., Biot (FR)

(72) Inventors: Eduardo Rafael Lopez Ruiz, Juan-les-Pins (FR); Nicolas Guillon, Mouans-Sartoux (FR); Paul Krion, Munich (DE); Jürgen Oesterle, Munich (DE); Martin Stammler, Munich (DE); Martin Kuhn, Munich (DE); Sebastian Bildner, Munich (DE); Thomas Stark, Munich (DE)

(73) Assignee: Amadeus S.A.S., Biot (FR)

( * ) Notice: Subject to any disclaimer, the term of this patent is extended or adjusted under 35 U.S.C. 154(b) by 0 days.

(21) Appl. No.: 16/629,464

(22) PCT Filed: Jul. 6, 2018

(86) PCT No.: PCT/EP2018/068373
§ 371 (c)(1),
(2) Date: Jan. 8, 2020

(87) PCT Pub. No.: WO2019/011804
PCT Pub. Date: Jan. 17, 2019

(65) Prior Publication Data
US 2020/0142862 A1 May 7, 2020

(30) Foreign Application Priority Data

Jul. 13, 2017 (FR) ........................... 1756717

(51) Int. Cl.
*G06F 16/16* (2019.01)
*G06F 16/18* (2019.01)
(Continued)

(52) U.S. Cl.
CPC .......... *G06F 16/16* (2019.01); *G06F 16/1865* (2019.01); *H04L 51/046* (2013.01); *H04L 51/08* (2013.01); *G06Q 30/04* (2013.01)

(58) Field of Classification Search
CPC ...... G06F 16/00; G06F 16/16; G06F 16/1865; G06F 40/174; G06F 9/00; G06K 2209/01;
(Continued)

(56) References Cited

U.S. PATENT DOCUMENTS

2006/0089907 A1  4/2006  Kohlmaier et al.
2009/0092318 A1*  4/2009  Berard .................. G06K 9/033
                                                          382/176
(Continued)

FOREIGN PATENT DOCUMENTS

EP    2634735 A1   9/2013
WO    2014022919 A1   2/2014

OTHER PUBLICATIONS

Shadma Skaikh, "Expense management platform Fyle Technologies raises Rs 2.7 cr in a seed round", Feb. 14, 2017, retrieved from the internet at https://economictimes.indiatimes.com/small-biz/money/expense-management-platform-fyle-technologies-raises-rs-2-7-cr-in-a-seed-round/printarticle/57139677.

(Continued)

*Primary Examiner* — Tan H Tran
(74) *Attorney, Agent, or Firm* — Thompson Hine LLP

(57) ABSTRACT

Systems and methods of integrating message content into a target processing device configured to process input data having a predefined data structure. A messaging server is configured to receive a message from a messaging client device executing a messaging application. An orchestrator device is configured to integrate at least a part of the message content into a target data processing device, receive the part of the message content from the messaging server, (Continued)

and transmit a file derived from the part of the message content to a file processing device. The processing device is configured to transform each received file into a description file comprising a set of predefined keys. The orchestrator device is configured to derive an input file having the predefined data structure from the description file and transmit the input file to the target data processing device for processing of the input file by the target processing device.

20 Claims, 12 Drawing Sheets

(51) Int. Cl.
*H04L 51/046* (2022.01)
*H04L 51/08* (2022.01)
*G06Q 30/04* (2012.01)

(58) Field of Classification Search
CPC ........ G06Q 10/10; G06Q 30/04; G06Q 40/12; H04L 51/046; H04L 51/08; H04L 67/2823
See application file for complete search history.

(56) References Cited

U.S. PATENT DOCUMENTS

| | | | | |
|---|---|---|---|---|
| 2012/0066612 | A1* | 3/2012 | Virmani | G06F 3/0481 715/748 |
| 2012/0278728 | A1* | 11/2012 | Malin | H04N 21/47202 715/748 |
| 2013/0230246 | A1* | 9/2013 | Nuggehalli | G06Q 10/10 382/176 |
| 2013/0232041 | A1* | 9/2013 | Nuggehalli | G06Q 10/105 705/30 |
| 2014/0288981 | A1* | 9/2014 | Rajkarnikar | G06Q 10/02 705/5 |
| 2017/0116494 | A1* | 4/2017 | Isaev | G06K 9/344 |
| 2017/0255974 | A1* | 9/2017 | Kulkarni | G06Q 20/14 |

OTHER PUBLICATIONS

Yashwanth Madhusudan, "Fyle with Outlook", Jan. 4, 2017, retrieved from the internet at https://blog.fyle.in/fyle-with-outlook-5d11c5e99f6.

Disha Sharma, "Expense management startup Fyle Technologies raises $400K from Pravega, others", Feb. 14, 2017, retrieved from the internet at https://techcircle.vccircle.com/2017/02/14/expense-management-startup-fyle-technologies-raises-400k-from-pravega-others.

Microsoft, "Fyle—One Click Expense Management", Dec. 22, 2016, retrieved from the internet at https://appsource.microsoft.com/en-us/product/office/WA104380673?tab=Overview.

Adithya Kavuluru, "Fyle Extension on Outlook", You Tube, Dec. 26, 2016, p. 1, retrieved from the internet at https://www.youtube.com/watch?v=BfkfMsiKoKk.

European Patent Office, International Search Report and Written Opinion dated Jul. 31, 2018 in International Application No. PCT/EP2018/068373.

IP Australia, Examination Report dated Sep. 30, 2020 in Application No. 2018299826.

IP Australia, Examination Report dated May 17, 2021 in Application No. 2018299826.

New Zealand Intellectual Property Office, Patent Examination Report dated Aug. 30, 2021 in Application No. 760613.

New Zealand Intellectual Property Office, Patent Examination Report dated May 12, 2021 in Application No. 760613.

* cited by examiner

```
{
  "request": {
    "headers": {
      "accept": "application/json",
      "accept-version": "2.1.0",
      "x-render-pdfs": "false",
      "x-store-ignore": "true"
    },
    "id": "8b17101e-6c93-47f8-8625-c2ff06cc5587",
    "parameters": {
      "doctype": null,
      "filename": "Scan 0.jpeg",
      "lang": null,
      "presets": null
    }
  },
  "response": {
    "duration": 2725,
    "pages": [
      {
        "height": 1672,
        "width": 912
      }
    ],
    "result": {
      "_all": {
        "amount-1be2596f-5900-4472-87e4-e7aa8558eadb": {
          "children": null,
          "coordinates": {
            "x0": 489,
            "x1": 581,
            "y0": 1269,
            "y1": 1304
          },
          "page": 0,
          "preformatted": "14.23 EUR",
          "raw": "14.23",
          "type": "amount",
          "values": {
            "amount": "14.23",
            "currency": "EUR"
          }
        },
        "date-a1b27e81-57c5-43cc-b5c6-a39e3e6bd14f": {
          "children": null,
          "coordinates": {
            "x0": 46,
            "x1": 362,
            "y0": 1367,
            "y1": 1402
          },
          "page": 0,
          "preformatted": "2017-03-29",
          "raw": "29-03-2017 16:55",
          "type": "date",
          "values": {
            "date": "2017-03-29",
            "time": "16:55:00"
          }
        }
      },
      "amounts": {
        "total_amount": {
          "candidates": [
            {
              "confidence": 0.8497,
              "preformatted": "17.08 EUR",
              "ref_id": "amount-55217334-cf12-4bb1-85de-a68f5bbcf903"
            }
          ],
          "confidence": 0.8497,
          "id": "197c871a-2200-4c0e-96a4-da7205ad4f44",
          "preformatted": "17.08 EUR",
          "ref_id": "amount-55217334-cf12-4bb1-85de-a68f5bbcf903"
```

190

FIGURE 11

SYSTEM AND METHOD FOR INTEGRATING MESSAGE CONTENT INTO A TARGET DATA PROCESSING DEVICE

BACKGROUND

The invention generally relates to messaging systems, and in particular to methods, systems, and computer program products for integrating message content into a target data processing device.

In conventional messaging systems, a user may need to input non-structured data related to a common item, such as for example electronic or digitalized invoices related to an expense, to a target data processing device related to a dedicated application field, such as an Expense Reporting System. The target data processing device then processes the data input by the user and if the input data and receipts are compliant, the Expense Reporting System generates an expense report for one or more receipts provided by a user for processing.

In some cases, the user may directly connect to the target data processing device through a dedicated interface to manually fill a form for each operation or transaction (e.g. business trip), where he or she is required to enter the information contained in receipts or invoices.

Such interactions are cumbersome, time-consuming and source of errors (typographical errors, etc.) for the user. Further, they may generate erroneous information so that the user may be required to check the form or even input the data again. Also, when such interactions are manual, they are also restricted in terms of amount or richness of collected information.

Thus, improved systems, methods, and computer program products for integrating content into a target data processing device are needed.

SUMMARY

In order to address these and other problems, there is provided a system of integrating message content into a target processing device, the target data processing device being configured to process input data having a predefined data structure, the system comprising a messaging server configured to receive a message from a messaging client device executing a messaging application, the message comprising message content. The system further comprises an orchestrator device configured to integrate at least a part of the message content into a target data processing device, the orchestrator device being further configured to:
receive the part of the message content from the messaging server; and
transmit a file derived from the part of the message content to a file processing device, the file processing device being configured to transform each received file into a description file comprising a set of predefined keys, at least some of the keys being associated with one or more values, the orchestrator device being configured to derive an input file having the predefined data structure from the description file and transmit the derived input file to the target data processing device for processing of the derived input file by the target processing device.

In one embodiment, the orchestrator device may be connected to the messaging server according to a first communication protocol, and/or to the messaging application according to a second protocol, and/or to the target data processing device according to a third communication protocol.

The messaging application may comprise an application interface and an application extension configured to generate a rendering of an input file derived from the description file provided by the file processing device in a dedicated area the application interface.

The file processing device may be configured to map one or more data items of the part of the message content to at least some keys of a predefined set of keys, the file processing device being configured to generate the description file from the part of the message content, the description file comprising the set of predefined keys, the one or more values associated with the keys of the description file being derived from the data items mapped thereto.

The file processing device may be further configured to determine sets of positioning data from the file received from the orchestrator device, each set of positioning data identifying the position of a data item of the file mapping a key of the predefined set of keys, each set of positioning data being included in the description file in association with the key mapped to the data item.

Each set of positioning data may comprise positioning coordinates in a given referential.

In one embodiment, the application interface may be a graphical application interface, the application extension being configured to render the description file in a dedicated area of the application interface.

The file processing device may be further configured to determine a scoring for each value associated with a given key of the predefined set of keys, and to include the scoring determined for the value associated with the given key in the description file.

The application extension may be further configured to display an image of the message content part in the dedicated area, and to generate a display of one or more selectable highlighting items for each data item of the message content part mapping a key, each highlighting item for a given data item being displayed at a position of the displayed image being determined from the set of positioning data identifying the position of the data item.

The orchestrator device may be configured to use a message identifier associated with the message for each exchange between the orchestrator device and the messaging server and/or the application extension, and/or the file processing device and/or the target device.

There is further provided a method of integrating message content into a target processing device, the target data processing device being configured to process input data having a predefined data structure, the method comprising receiving a message from a messaging client device executing a messaging application, the message comprising message content. The method may comprise integrating at least a part of the message content into the target data processing device, the method being further configured to determine a file derived from the part of the message content and transform the file into a description file comprising a set of predefined keys, at least some of the keys being associated with one or more values, the method comprising deriving an input file having the predefined data structure from the description file and transmitting the derived input file to the target data processing device for processing of the derived input file by the target processing device.

There is also provided a computer program product comprising:
a non-transitory computer readable storage medium; and instructions stored on the non-transitory computer readable storage medium that, when executed by a processor, cause the processor to integrate message content into a target processing device, the target data processing device being configured to process input data having a predefined data structure, the processor being further caused to:

receive a message from a messaging client device executing a messaging application, the message comprising message content;

integrate at least a part of the message content into the target data processing device, the processor being further caused to determine a file derived from the part of the message content and transform the file into a description file comprising a set of predefined keys, at least some of the keys being associated with one or more values, derive an input file having the predefined data structure from the description file and transmitting the derived input file to the target data processing device for processing of the derived input file by the target processing device.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 11 is a view of an exemplary description file in Json format.

DETAILED DESCRIPTION

Figure 1:
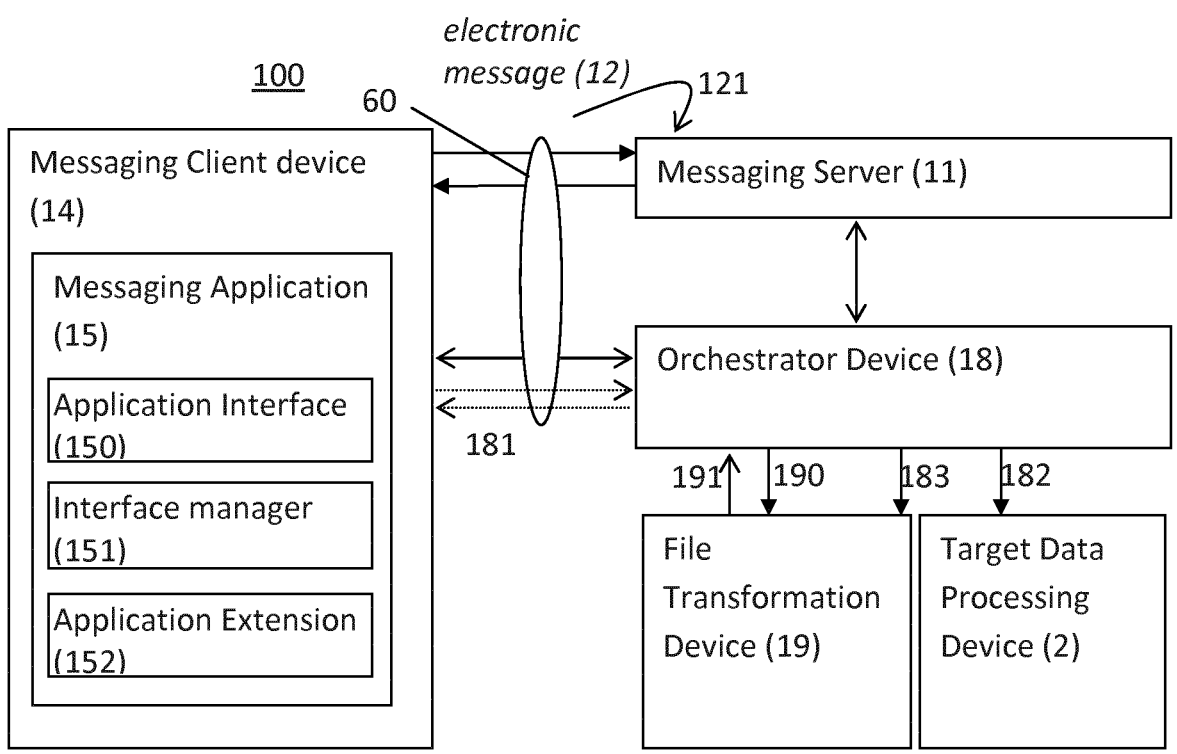
FIG. 1 is a diagrammatic view of an exemplary operating environment including a system for integrating at least one file into a target data processing device.

FIG. 1 is a diagrammatic view of an exemplary operating environment including a system 100 for integrating at least one file into a target data processing device 2. The system 100 may comprise a messaging server 11 configured to receive an electronic message 12 (such as an "email", an instant messaging also referred to as online chat or a feed) from a messaging client device 14 executing a messaging application 15. The electronic message may comprise message content in the form of message data included in the message body, and/or one or more files attached to the message (also referred to as "attachments" or "attached files"). The message content may be related to one or more operations (also referred to as "transactions"). The application may be for example Microsoft Outlook and the messaging server 11 may be for example Microsoft Exchange Server (Microsoft Outlook and Microsoft Exchange Server are registered trademarks of Microsoft Corporation).

The target data processing device 2 may be configured to process an input data file having a predefined data structure and being related to target operations, according to a dedicated process.

In one exemplary application of the invention, the target data processing device 2 may be an Expense Processing Device or tool (also referred to as an Expense Reporting Device) used by a company or an entity to process expense reports of the employees of the company or entity, or by a private individual to manage his personal expenses. In a company context, such Expense Processing Device 2 may be configured to receive a description file identifying an expense operation (e.g. business trip) to generate an expense report enabling reimbursement of the user if the expense related data input is compliant with predefined rules. Each expense may be related to an expense statement representing the set of expenses made by a company or on behalf of a company for a given transaction. The Expense Processing Device 2 may be located internally (e.g. desktop software application pre-installed on the user device) or externally to each client device 14 and/or distributed among multiple computers (e.g. in the form of a client-server software application, such as a web application). In such exemplary application, the attachment files may comprise attachments corresponding to receipts related to one or more expenses, the attachments being for example a photo or a scanned copy of the receipt, an electronic invoice in PDF format sent by an hotel, restaurant or taxi company corresponding to the service invoiced in the receipt.

The messaging server 11 may be configured to receive electronic messages, buffer the received messages, and send the messages to a destination device.

Each client device 14 (also referred to as a "user device") may be a personal computing device, a tablet computer, a thin client terminal, a smartphone, and/or other such computing device. Each client device 14 may host web browsers and/or custom applications software (e.g., a client system) and may include a client user interface.

More generally, the client device 14 may be any suitable computing system configured to execute a messaging application 15 associated with an Application Interface 150, through which a user can send or receive electronic messages.

Each electronic message 12 may be associated with a unique message identifier uniquely identifying the message.

The messaging application 15 may comprise an interface manager 151 for rendering application data into the application interface 150.

The messaging server 12 may be configured to store each electronic message in a database together with the attachment files if the message content comprises attachments.

As used herein, a "message attachment" (also referred to herein as an "email attachment", an "attached file" or simply as an "attachment") refers to an electronic file or document comprised in an email, the electronic file being represented by a clickable representation element, such as a thumbnail associated with a file name. Each attached file 121 has a file format such as for example a format jpeg, gif, pdf, Word, Html. A file format can be "structured" or "non-structured". The message attachments may include photos or images having different formats. A message attachment may alternatively include a file that is in the body of the message, such as an in-mail image or other reproduction of a file in question.

The system 100 may comprise an orchestrator device 18 configured to integrate selected message content received by the messaging application 15 into the target data processing device 2. The message content may be any content received in any type of message handled by the application such as content of an email, an instant messaging, a feed. In the example of an email, the content may be included in the email body or in a file attachment.

To facilitate the understanding of some embodiments of the invention, the following description will be made with reference to integration of file attachments into a target data processing device, although the skilled person will readily understand that the invention generally apply to an message content received by a message application 15. However, hereinunder, "attachment" or "attached file" will be understood to comprise any in-message content.

The attachment files may be selected or filtered by the orchestrator device 18 depending on several file related criteria such as the filename, the file extension, the file size.

The messaging application 15 may comprise an executable application extension 152 (an application extension may be also referred to as a "plugin", "addin" or or "extension software component") configured to add a dynamic data integration feature to the application 15. In particular, the application extension 152 may be configured to manage a dedicated area of the application interface 150, and interact with the orchestrator device 18. The application extension 152 may be further configured to generate a rendering of data received from the orchestrator device 18.

The application interface 150 and in particular the dedicated area of the application interface managed by the application extension 152 may comprise different types of graphical elements, such as windows, text input fields, icons, selectable elements, graphical control elements such as drop-down menus or list box, activation buttons, etc.

The system 100 may further comprise a file processing device 19 (also referred to as a "File transformation device") configured to convert or transform an input file 190 in non-structured format into a description file 191 having the predefined data structure supported by the target data processing device 2 and comprising a predefined set of keys, at least some of the keys being associated with one or more values.

In an application of the invention to expense reporting or management, the set of keys may include keys that are common to all receipts (also referred to as "mandatory keys") such as:
  the receipt type;
  the date of the receipt;
  the amount of the receipt;
  the vendor identification (name of the invoicing company such as a hotel name, the taxi company, etc.).

The set of keys may further include keys that depend on the sub-type of receipt (e.g. taxi receipt, hotel receipt, restaurant receipt) such as:
  itinerary of the taxi (origin/destination) for a taxi receipt;
  number of nights for a hotel receipt;
  additional services for a hotel service: breakfast, dinner, etc.

The orchestrator device 18 may be configured to:
  receive the selected files stored by the messaging server 11 or directly from the messaging client device 14 (for example, the user may forward an email comprising receipt attachment to a component of the orchestrator device); and
  transmit a set of files derived from at least some of the selected files to the file processing device 19.

The orchestrator device 18 may be configured to transmit a description file 182 derived from the description file 191 to the target data processing device 2. In a preferred embodiment, the description file 191 may be previously refined by the orchestrator device 18 in response to inputs received from the user through the dedicated area of the application interface handled by the application extension 152.

In particular, the application extension 152 may be configured to generate a rendering of the description file derived from the description file 191 provided by the file processing device using the interface manager 151.

The target data processing device 2 can then process the description file 182, received from the orchestrator device 18, and initiate a dedicated process, depending on the application field of the target data processing device.

In some embodiments, each file 190 input to the file processing device 19 by the orchestrator device 18, which corresponds to an original file attachment 121, may be associated with a user identifier and/or to a context (such as for example travel information, company information, location information for a trip receipt, in the example of an expense report implementation of the invention).

In an application of the invention to expense report generation or expense management, the system 100 according to embodiments of the invention enables a reliable acquisition of receipts related to an expense without a need for the user to manually input the data into a form via a direct interfacing with the Expense Processing System 2. The Expense Processing System 2 can accordingly acquire and verify each receipt, and reconcile it with a user account to enable reimbursement of the user who made the expenditure. By simplifying, increasing the reliability and the rate of acquisition of expense data by the Expense Processing System 2, the delay for reimbursing the user can be improved.

Further, according to embodiments of the invention, the client device 14 may integrate different expenses related to one or more expense statements into the Expense Processing Device 2 without a need for the user to directly interface with the Expense Processing Device or to fill a dedicated form in an interface of the Expense Processing Device.

In some embodiments, the orchestrator device 18 may be connected to the messaging server 11 according to a first communication protocol, to the messaging application 150 according to a second protocol, to the file processing device 19 according to a third communication protocol, and to the target data processing device 2 according to a fourth communication protocol.

In one embodiment, the first, second, third and fourth communication protocols may be the same. Alternatively, at least some of the first, second, third and fourth communication protocols may be the different.

The messaging application extension 152 may be launched automatically when the user launches the messaging application 15. Alternatively, the messaging application extension 152 may be launched dynamically in response to one or more conditions related to the file attachments present in an email, such as for example, if an email comprises at least one file attachment, or if the email comprises at least one file attachment having specific file names, or specific file extensions, or specific file sizes, or conditions related to the sender, to the wording included in an e-mail subject, or other conditions which may be determined by machine learning with other e-mail that were previously submitted.

In another embodiment, the application extension 152 may be launched statically in response to the activation of a dedicated element of activation, such as a button, by a click of the user. Such element of activation may be displayed in the application interface 15, for example directly in the email body, or in the toolbar.

The activation of the messaging application extension 152 may trigger a selection of a subset of the attached files depending on one or more conditions, such as conditions related to the attachment format. The activation of the messaging application extension 152 may further the display of a thumbnail of each selected file in a dedicated area of the application interface.

In another embodiment, the user may directly select attached files by drag and drop operation to move them to the dedicated area or by clicking a selection button associated with each attached file. The application extension may then generate a clickable thumbnail of the selected attachments in the dedicated area. In some embodiments, the application extension may further display a full view of each file attachment (e.g. receipt) which is being integrated into the target data processing device 2, in the form of an image. In some embodiments, the displayed file attachment initially displayed in full view can be zoomed in/out by the user in order to facilitate the receipt view by the user.

In some embodiments, the file processing device 19 may be part of the orchestrator device 18. However, the following description of some embodiments of the invention will be made with reference to a separate file processing device 19.

The messaging server 11 may communicate with one or more client devices 14 through a communication network 60.

The orchestrator device 18 may reside in the same computing system as the File Processing device 19, and/or the Target data Processing device 2 and/or the messaging server 11. Alternatively the orchestrator device 18, the File Processing device 19, and/or the Target data Processing device 2, and/or the messaging server 11 may reside in different computing systems and communicate through one or more communication networks.

Each communication network use to enable communicate between two devices of the system 100 may include one or more private and/or public networks (e.g., the Internet) that enable the exchange of data such as the Internet, a local area network (LAN), a wide area network (WAN), a cellular voice/data network, one or more high speed bus connections, and/or other such types of communication network. Each communication network such as network 100 may use standard communications technologies and/or protocols such as 4G, Ethernet, 802.11, TCP/IP (Transmission Control Protocol/Internet Protocol, HTTP (Hypertext Transport Protocol), FTP (File Transfer Protocol), etc. Data can be exchanged over each network according to different data exchange technologies and/or formats such as the hypertext markup language (HTML), the JSON model and the extensible markup language (XML).

In conventional operation:
in transmission mode, the messaging client device 11 may request the messaging server 11 to transmit a message 12 to one or more recipients identified in the recipient designation items 122 corresponding to destination client devices, within the same network or on another accessible network.
in reception mode, the client device 14 may receive a message 12 from another client device directly in a 'push' mode or, or indirectly through receiving a notification informing the receipt of a new message at the server 12, the client device being then configured to 'pull' the message from the server 11.

A security token may be used to recover files and validate the communication/exchanges.

Figure 2:
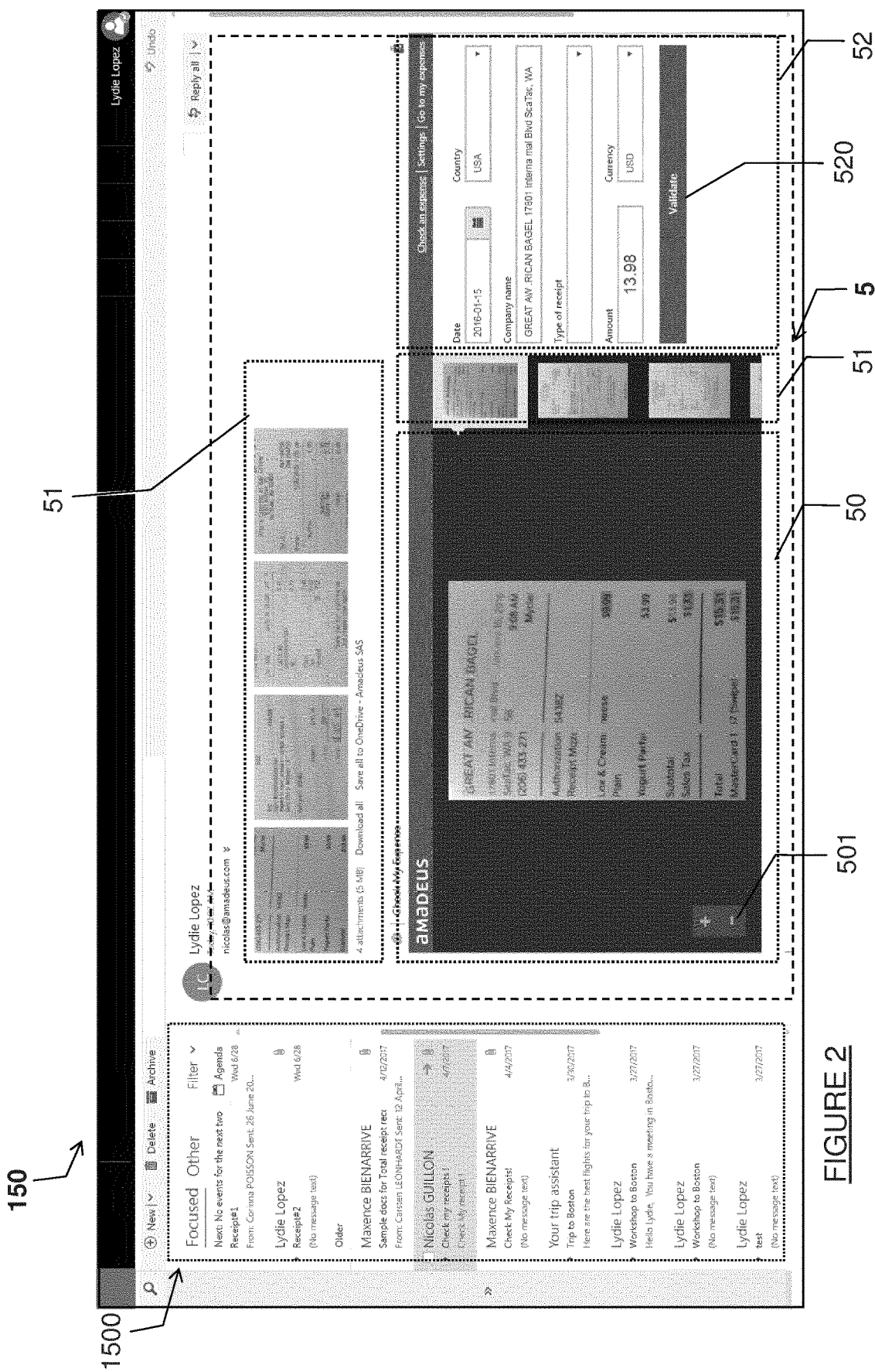
FIG. 2 shows an exemplary application interface, according to an embodiment.

Referring to FIG. 2, an exemplary application interface 150 is shown in which the considered target processing device 2 in an Expense Reporting Device, according to an exemplary embodiment. According to such exemplary embodiment, the activation of the messaging application extension 152 may trigger a display in a dedicated interface area 5 located in a part of the application interface 150. The interface area 150 may comprise the message inbox in a portion 1500 of the interface area including the current email which comprises the attachments. In the exemplary embodiment shown in FIG. 2, the dedicated area 5 may be divided into three parts comprising for example:
a first part 50 ("image view part"),
a second part 51 ("thumbnail view part"), and
a third part 52 ("verification form view part").

The first part 50 may be provided to display an image view of each attachment which may be a full view which can be moved or zoomed in/out by the user, during the processing of this attachment by the orchestrator device 18. The second part 51 may include a thumbnail of the relevant attachments (or in-mail image). The third part 52 may be provided to display a verification form derived from the description file 191 returned by the file processing device 19. This enables the user to compare the data of the form as extracted by the file processing system with the corresponding original attached file 121 displayed in the part 50.

The skilled person will readily understand that the form is not restricted to the form fields shown in the example of FIG. 2, but may include to other fields which can extracted or deduced ("country" field can be for example deduced by an "address" or "currency" data item).

The files displayed in the dedicated area 5 may be processed sequentially by the orchestrator device 18. In such embodiment, the processing of a file attachment 121 by the orchestrator device 18 may be triggered by the user. In a more general application of the invention, any content of a message could be similarly processed.

The image view part 50 may for example include a zooming element 501 for enabling user to zoom or move a displayed file attachment. In another embodiment, the application extension 152 may include checkboxes in the second part 52 of the dedicated area 5 next to each individual attached file, the user being able to select one attachment for integration into the target data processing device 2 by using the check box. In still another embodiment, the file attachments may be processed automatically according to an arbitrary order or predefined criteria.

In an alternative embodiment, the selected files (e.g. receipts) may be processed in parallel by the orchestrator device 18 and/or the file processing device 19. To facilitate the understanding of the invention, the following description will be made with reference to a sequential processing of the selected files, for illustration purpose.

In some embodiments, the form view part 52 may further include a validation button 520 which may be selected by the user to validate the form.

Figure 3:
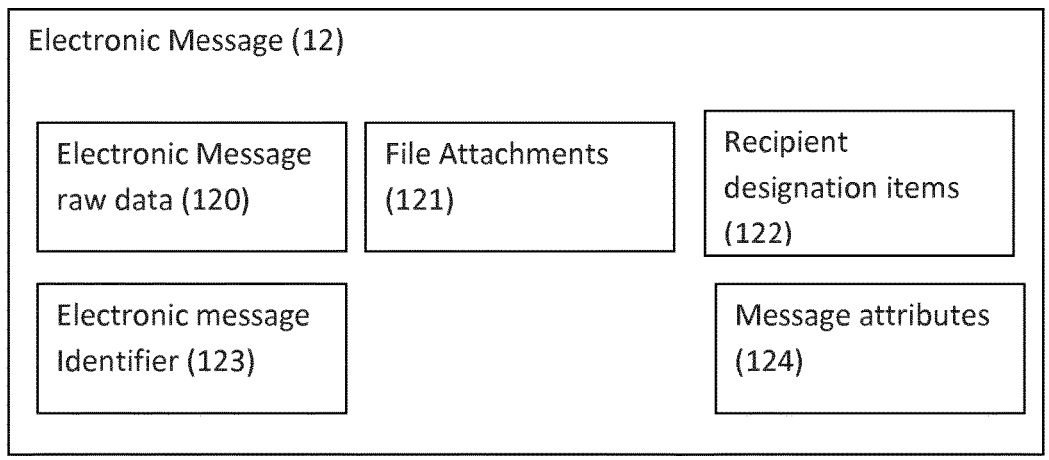
FIG. 3 schematically shows an exemplary structure of an electronic message.

FIG. 3 schematically shows an exemplary structure of an electronic message 12 sent from the Messaging Client Device 14 to the Messaging Server 11.

As shown an electronic message 12 may comprise raw data 120, recipient designation items 122 identifying one or more recipients, message attachments 121, a message identifier 123 uniquely identifying the message, message attributes 124 representing attributes of the message such as a message expiration attribute.

Figure 4:
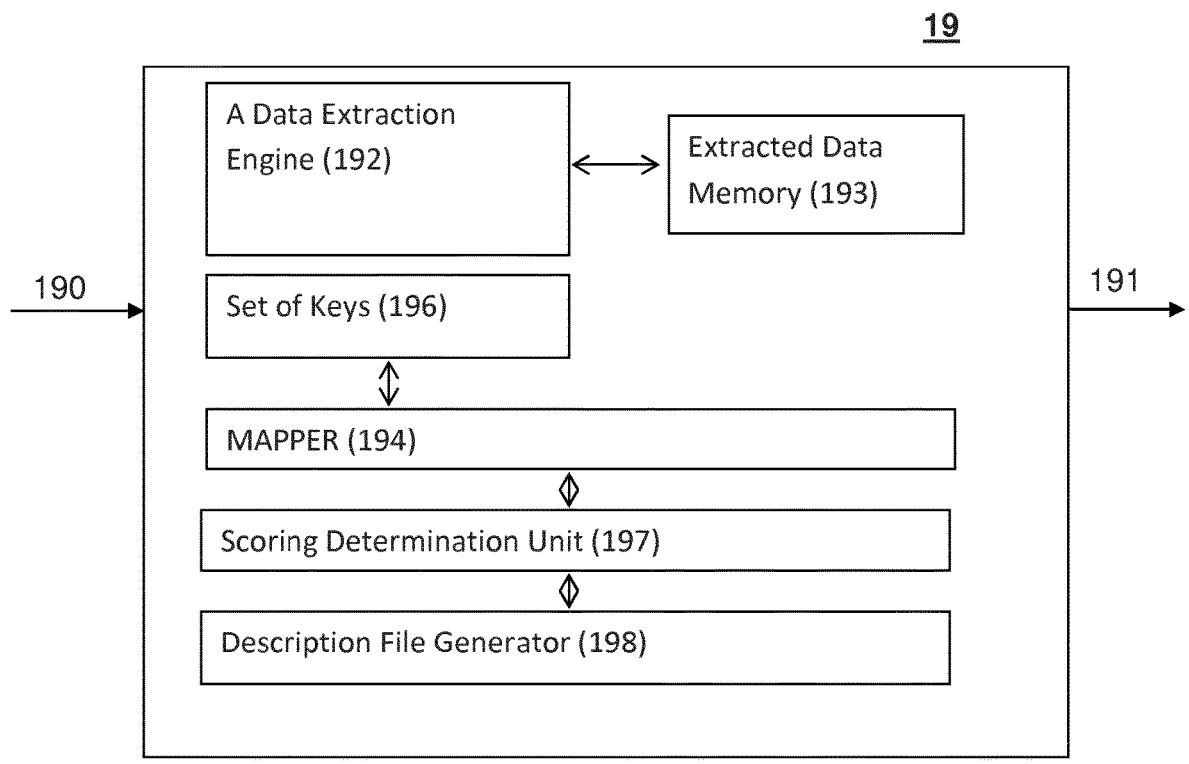
FIG. 4 is a diagrammatic view of the file processing device, according to some embodiments.

FIG. 4 is a diagrammatic view of the file processing device according to some embodiments.

The file processing device 19 may comprise:
- a data extraction engine 192 configured to extract characters in the non-structured file 190 (e.g. receipt image corresponding to a scanned image or a photo of a receipt for example) using at least one extraction algorithm such as an OCR (Optical Character Reader) algorithm; the data extraction engine 192 may thereby extract the data from the attachment file received as input in one embodiment and provide digitized data that they may be stored in a memory 193 (Extracted Data Memory);
- a mapper 194 configured to map at least some keys of a predefined set of keys 196 to one or more data items of digitized data captured from the non-structured file 190 received as input by the file processing device 190; the mapper 194 thus provides set of keys, each associated with one or more values corresponding to the data items mapped thereto;
- a description file generator 198 configured to generate the description file 191 from the input file 190, with the description file comprising the set of predefined keys 196, each key being associated with the zero, one or more values derived from the data items of the input file 190 mapped to the key.

In one embodiment, the set of keys 196 to be mapped to the data items of the attachment file may be previously filtered depending on the type of the file attachment or received from the orchestrator device 18, the orchestrator device 18 having previously retrieved the set of keys from the target processing device 2 depending on the detected type of the file attachment. In an expense report/management application of the invention, considering file attachments of receipt sub-types, a receipt may have several sub-types such as taxi sub-type, hotel sub-type, restaurant sub-type, each receipt sub-type being associated with a predefined set of keys (a taxi sub-type receipt may be for example associated with a set of keys including the date, the amount, the itinerary (origin/destination), the taxi company name, etc.).

The description file may have any format that uses text to transmit data objects consisting of attribute-value pairs and possibly array data types or any other serializable value, such as JavaScript Object Notation or JSON.

As used herein a "description file" refers to a document that uses text to transmit data objects consisting of attribute-value pairs.

In one embodiment, the file processing device 19 may further comprise a positioning data determination unit (PDDU) configured to determine sets of positioning data from the input file 190. The set of positioning data may be determine by the data extraction engine 192 and used by the mapper 194 to identify the position of a data item mapped to a key of the predefined set of keys 196 in an image representing the attachment file 190. Each set of positioning data identifying the position of a data item of the file attachment mapped to a key may be inserted in the description file 191 (JSON file for example) in association with the key.

In one embodiment, each set of positioning data may comprise positioning coordinates (x,y) in a given referential, such as a 2D referential (X, Y) defined by the original non-structured file.

In one embodiment, the file processing device 19 may comprise a scoring determination unit 197 configured to determine a scoring for the candidate values mapped to some keys by the mapper 194. Accordingly, for a given key associated with several candidate values, each value may be assigned with a scoring. The file processing device 19 may be further configured to include the scoring determined for each value associated with a given key in the description file 191. Alternatively, the file processing device 19 can present the candidate value according to a relevance order depending on the scoring.

In some embodiments, the scoring may be determined for the keys that are considered as mandatory to trigger a processing by the target data processing device 2. For example, in an application of the invention to expense report/management, a file attachment of receipt type is required to have at least a date key and an amount key.

Figure 5:
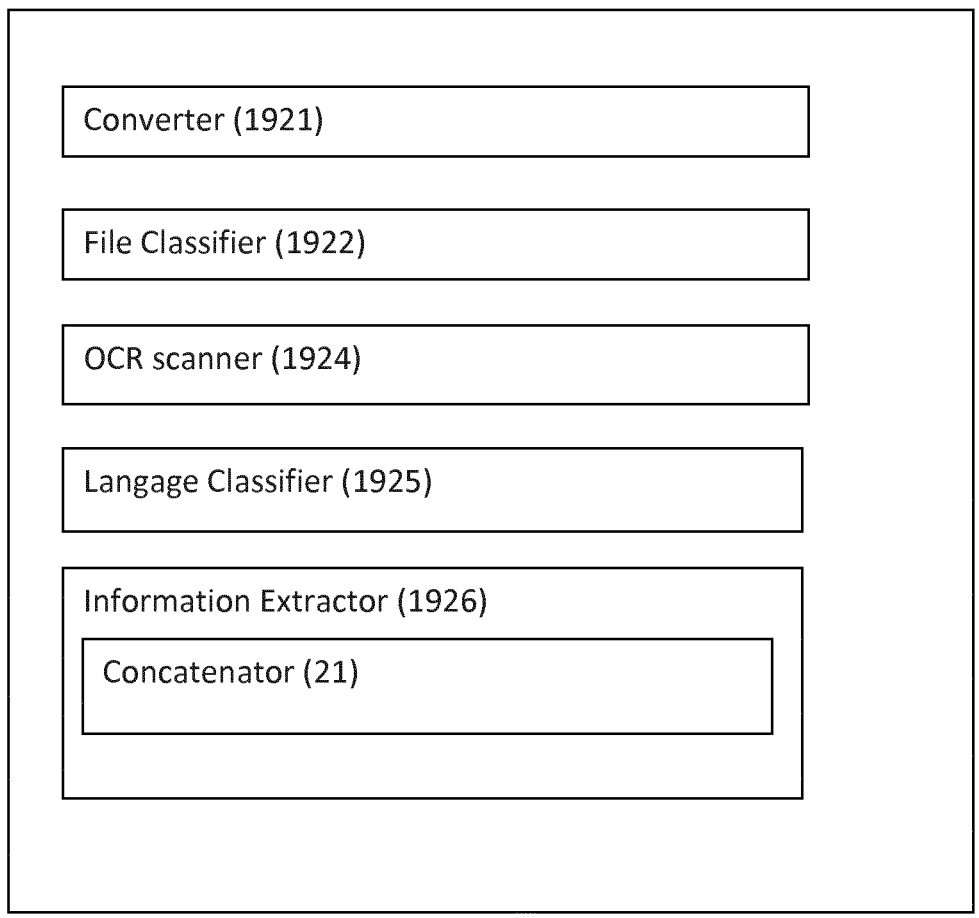
FIG. 5 is a diagrammatic view of the data extraction engine of the file processing device, according to some embodiments.

FIG. 5 shows a diagrammatic representation of the Data Extraction Engine 192 of the file processing device 19 according to an exemplary application of the invention to Expense reporting or management.

Each file attachment received by the file processing device 19 may be accordingly a receipt. In some embodiments, the file processing device 19 may receive all files attached or otherwise included by a user in an email, process each file and trigger an error if a file is not of a receipt type. In another embodiment, each file attachment may be processed in an initial phase of the processing to check if it has a receipt format and/or detect the type of receipt and/or retrieve the keys associated with the type of receipt.

The data extraction engine 192 may comprise a converter 1921 configured to initially evaluate one or more attributes of the file attachment which are needed in order to apply OCR and/or to optimize the performance of the data extraction. The values of these attributes may be checked and/or normalized if their values are not optimal, for example by:
- Rotating the image; or
- Verifying and correcting the resolution of the image (Dots Per Inch) in case the resolution indicated by the camera is lower than the real resolution.

The data extraction engine 192 may further comprise a File Classifier 1922 configured to identify the type of a file attachment (e.g. electronic invoice, receipt, etc.) in order to optimize the data extraction from the file attachment. Such document types may provide information about the layout of the file attachment and identify the type of information which is to be extracted.

The file Classifier 1922 may be configured to identify the type of file attachment (e.g. taxi, hotel, etc.) by comparing the file attachment to a known set of similar reference documents (e.g. TAXI text). A document is considered as similar to a file attachment if it comprises a set of attributes that are comparable to the attributes of the file attachment. Such reference documents may be determined from past reconciliations, fixed by user input and/or not invalidated by a threshold of users.

The file classifier 1922 may be configured to convert the image representing the file attachment Image into a feature vector using transformations and filters to provide a normalized input. In some embodiments, this may create a much smaller image in terms of file size and/or dimensions, which may be scaled down, with intensified edges, monochrome and with equalized brightness.

The file classifier 1922 may extrapolate the file type based on the feature vector thus obtained. In one embodiment, a machine learning based approach may be used to infer one or more properties of the file attachment from the feature vector, such as the number of columns, the ratio of the page, the location of the main body of text, the header location, and so on.

In one embodiment, if the input file 190 is received in image format, the data extraction engine 192 may comprise an OCR scanner 1924 configured to perform OCR scan to produce text from the file attachment and extract words. Alternatively, any data extraction technique may be used depending on the format of the input file 190 (for example, HTML and PDF text file).

The data extraction engine 192 may comprise a language classifier 1925 configured to use the extracted data (for example extracted by the OCR scanner 1924) to generate Trigrams representing overlapping groups of three letters. The repetition and existence of these trigrams may be used to determine the language(s) to a certain level of confidence (for example the trigram "LAN" is more present in Spanish than in English). The data extraction engine 192 may further use contextual data to increase the reliability of data extraction or derive some key value without a need to derive them from the OCR scan (e.g. known location of user, travel itineraries, GPS coordinates from photographs, etc.). In embodiments where the file attachments comprise more than several languages, the most prominent language may be selected: a predominance level may be assigned to each language depending on the level of use of the language throughout the file. The languages having a predominance level below a certain threshold may be ignored (for example, if the file attachment is a receipt comprising a restaurant name in French while the receipt is in German, German would be the predominant language). By identifying the languages of a document, the language classifier 1925 enable the data extraction engine 192 to better identify the text and the language it belongs to using an extraction algorithm such as an OCR algorithm. This obviates the need for scanning all possible languages and enables the use of language-specific dictionaries.

The language classifier 1925 may further use language location data which may be provided by the extraction algorithms (OCR algorithm for example) for each detected language identifying the location or region of the file attachment in which the detected language is used (e.g. indication that the top line is Bulgarian, while the bottom line is in English).

This enables better interpreting the content of the file attachment using an extraction algorithm (OCR algorithm). In an alternative embodiment, instead of using a language classifier 1925, the data extraction engine may be configured to translate the text into a language supported by the extraction algorithms.

The data extraction engine 192 may further comprise an Information Extractor 1926 using an extraction algorithm for extracting the characters in the file attachment 121, such as an OCR algorithm. The Information Extractor 1926 may further extract the sets of positioning data (e.g. coordinates) from the file attachment 121.

The skilled person will readily understand that the invention is not limited to the use of OCR Information Extractors, depending on the type of input file 190 received by the file processing device 19. In particular, in some embodiment the file processing device 19 may receive an input file 190 in any format including native text for which no OCR is needed. The following description of some embodiments of the invention will be made with reference to OCR extraction algorithms for illustration purpose only, the Information extractor 1926 being then referred as an OCR Information extractor.

The OCR Information Extractor 1926 may be configured to Serialize OCR data as follows.

The OCR Information Extractor 1926 may first read the output of the OCR scanner 1924 character-by-character, with coordinates and formatting. The OCR Information Extractor may comprise a "Concatenator" 21 to turn these characters into a target format. The target format may be for example a string to be fed into the grammars used for parsing the document and/or an index mapping the characters to their coordinates and formatting information. The initial "concatenation" may follow the "natural" read order of the text. However, additional concatenations may be provided to enable the recognition of phrases that do not necessarily follow this initial order. For example, in a two-column document layout, the concatenation may first return the text in the left column, then the text in the right column. However, on receipt attachment, the line items might be taken as left column and the prices as right column. Therefore, a "line-wise" concatenation that returns lines spanning the whole width of the document may be provided.

Important information about the layout of the document may be encoded as special characters in the returned string to help the interpretation of the string. Markers for "beginning of text block", "line break", "end of paragraph", "end of page" and so on may be included. Accordingly, information about the 2-dimensional structure of the document may be made available to the grammars and regular expressions, which otherwise would only work with 1-dimensional character streams.

The OCR Information Extractor 1926 may be further configured to extract candidate values using grammars and regular expressions. Context-free grammars and regular expressions may then used to search for relevant information in the text. The grammars may be based on the Unitex grammar framework (http://unitexgramlab.org/), for example. The string may be read to produce XML output for matches. Such XML output may then be read and turned into an objects representation. Using the index provided by the "Concatenator", every object may be assigned a set of positioning data such as coordinates data in a given referential This enables determining candidate values for further processing and enriching the information about candidate values based on its context. For example, all likely amounts may be extracted (substrings of the document that look like they could be amounts, e.g. "12.00"). If such string is followed by "€", then this amount currency may be marked as being Euro. If it is preceded by the word "Gesamtbetrag", it may be marked as being a good candidate for total amount. The grammars may be written in such a way that they match the minimal character string constituting the amount, but also the relevant preceding or following text, if present.

The OCR Information Extractor 1926 may additionally perform plausibility checks and/or possibly validation tests. For example, IBANs have an embedded check sum, which may be used to filter false matches or matches with OCR errors.

In an application of the invention to expense report, the OCR Information Extractor 1926 may be further configured to perform address extraction by searching for "anchors" which represent the combination of postal code and city (e.g. "81593 Munchen"). Matches for such anchors allow restricting the search space for the more complex grammars looking for complete addresses. Such anchor-matches may also have additional applications, for example for determining the country/city of the document without regard for the detailed address.

To map some particular mandatory keys of a receipt, some processing may be implemented by the file processing device 19.

For example, the OCR Information Extractor 1926 may be further configured to perform validation of detected amount (corresponding to an amount key) in a file attachment (receipt) using summation trees. In some cases, the relevant amounts of a given receipt may not be listed on their own, but together with other amounts which contribute to the target values. For example, the gross amount may be the sum of net and VAT amounts. Possible combinations of values may be summed up to larger values also found on the document, and a set of rules may be applied to try to find relationships between such items.

The rules may assign roles to matching amounts, like net, gross, total, cash etc.

The amount validation may be used in combination with other extraction strategies or in particular context such as for similar receipts. The amount validation may provide an additional parameter for confidence estimation. It may be independent of the other extraction strategies and may not consider properties being used by such extraction strategies, such as location on the document, font size, etc.

The amount validation process may be started with the complete set of amount candidates A extracted from a file attachment received by the file processing device 19. Then a subset-sum algorithm may be applied, which produces for every amount a in A all combinations of other amounts in A that sum up to a. The combinations may be transformed into summation trees. The value of every node in such a summation tree may be the sum of its direct children's values. Rules may be then applied, taking into account the structure of the tree, the amount values and tags from previous iterations. The rules may be applied to these trees in multiple iterations, allowing access to the results of earlier iterations. Some rules may make use of certain contextual information, like country and tax rate. The rules may assign tags marking role candidates. For example, an amount (1.19 €) is the sum of two other amounts found on the document (1.00 € and 0.19 €). Knowing the country where the receipt was issued (Germany) and the VAT (value-added tax) rate in this country (19%), such three amounts may be marked as gross, net and VAT amounts, respectively. There may be other amounts in the attachment (e.g. 0.70 €, 0.20 € and 0.10 €) that may add up to the gross amount. These other amounts may be then assumed to be the receipt items.

The resulting tags are not required to be correct, since they are used as one feature among others in the following scoring service.

To score the amount candidate values corresponding to the mandatory amount key of a receipt, the scoring determination unit 197 of the file processing device may assign each amount a probability corresponding to the likelihood that such amount represents the "total amount" of the receipt using an amount-scoring component. The scoring component 197 may use properties for every extracted amount that is based on the previous results. Every amount property may be either "true" or "false", depending on certain conditions and validation results. For example, such a property may be "is gross amount" or "has multiple occurrences on the document" or "written in larger font". These values may then be assigned weights depending on how often such property (or this combination of certain properties) was observed on total, VAT, or net amounts. Using such weights, the confidence score may calculated.

As such weights are based on past observations, they may be generated using either historical data of manually created examples.

The extraction engine 192 may be further configured to perform vendor identification to identify the issuing vendor of the receipt corresponding to the current file attachment in order to map candidate values to the vendor identification key. Instead of directly recognizing the vendor from the file attachment, the extraction engine 192 may be configured to extract information for inferring vendor identity, such as phone/fax numbers, trade register numbers, VAT ids, URLs and so on. Given a suitable database, such information may be used to infer the vendor identity. In some embodiments, the one or more candidate vendor identities (candidate values for vendor identity key) which are determined may be weighted by type of information used for inference, the vendor identity having the highest score being assumed to be the vendor identity.

The description file 191 thus generated by the file processing device 19 may be returned directly to the target data processing device 2.

Alternatively, in a preferred embodiment, the description file 191 may be returned to the orchestrator device 18 for refinement. The orchestrator device 18 may transmit a description file 181 corresponding to the description file itself 191 or a description file derived from the description file 191 to the application 15 shown in FIG. 1.

The following specification will be made with reference to such embodiment where the description file is returned to the orchestrator device 18 for refinement for illustration purpose only.

When the description file 181 is returned to the application 15 through the orchestrator device, the application extension 152 may be configured to render the extracted description file 180 in the dedicated area 5 of the application interface 150, for example in the second part 52 using a verification form comprising a set of fields, each field corresponding to one of the key of the description file 181 and each field having one of the values assigned to the key in the description file 181 or no value at all if no candidate value has been found by the file processing device 19. The value assigned to a field corresponding to a key of the description file 181 may be initially the value that is assigned the highest score for the key in the description file. The user may then correct the value manually or by using visual tools. This enables refinement of the description file by interacting with the client device 14 to increase reliability of the description file 181 with respect to the original file attachment 121.

Figure 6:
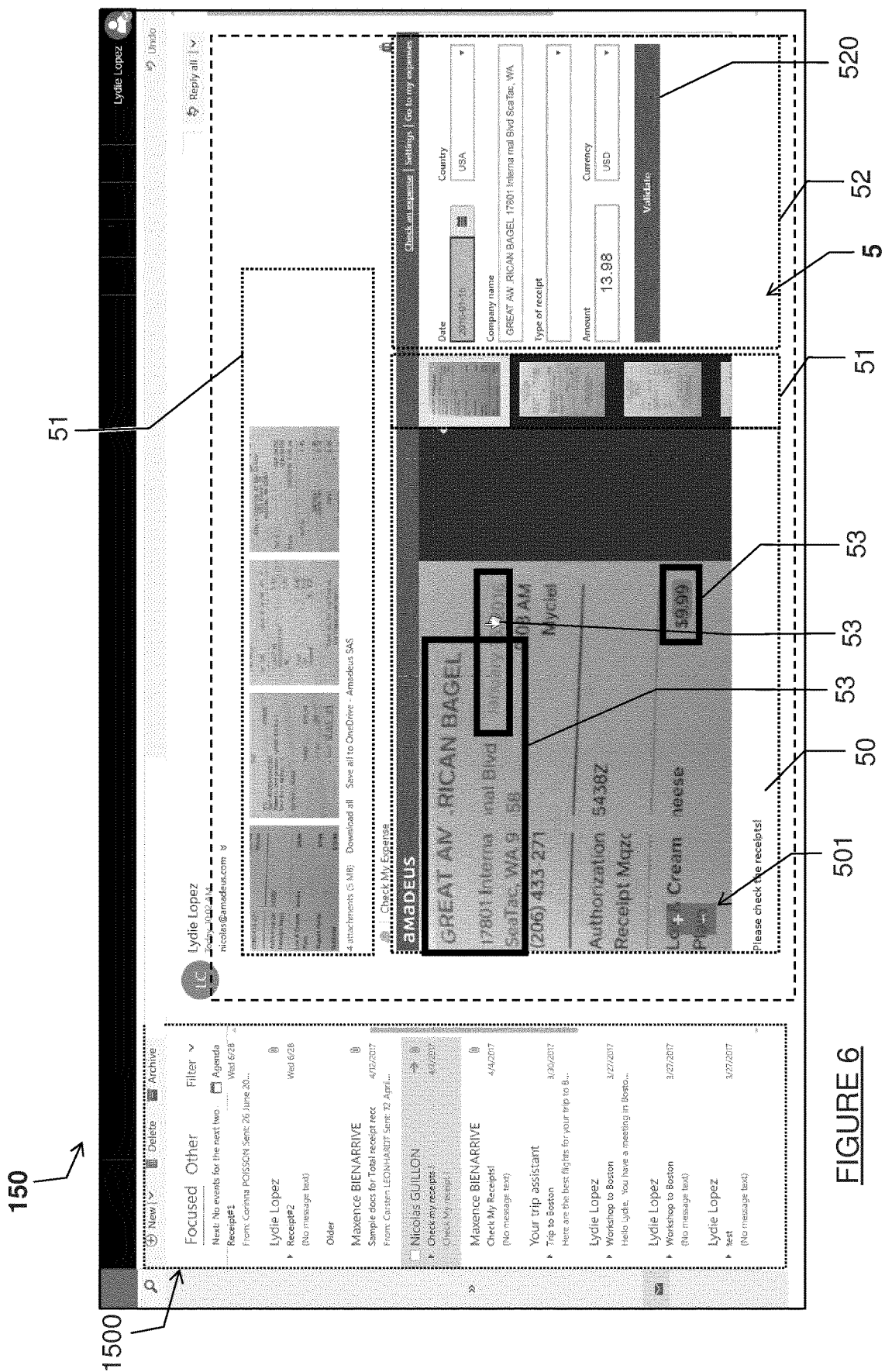
FIG. 6 represents an exemplary view of the application interface, according to some embodiments.

FIG. 6 represents a view of the application interface 150 in response to the receipt of the description file 181 from the orchestrator device 18, according to some embodiments.

In one embodiment, the application extension 152 may be further configured to generate a display of a selectable highlighting item or box 53 for each different candidate value found for a key (e.g. amount key) of each processed file attachment 121 (e.g.) from the description file 181 in order to facilitate the verification of the form by the user. Each highlighting box 53 may be displayed at a position of the file 121 determined from the set of positioning data identifying the position of the candidate value in the description file 181.

The highlighting boxes 53 may have different forms such as rectangles and/or be associated with a color code depending on the value of the scoring assigned to the candidate value to highlight the relevance of the candidate value as assessed by the file processing device 19. For example, a Green color code may be used to highlight the values which have been selected to complete the form (highest scoring) and the Red color may be used to highlight the other candidate values. If the user clicks a red highlighting element, the corresponding value may be used to update the form, and the highlighting item may become green while the highlighting item which was green may become red.

Alternatively, different visual items may be used to highlight the relevance of a key candidate value of the description file 181 from the scoring assigned to the value. In one exemplary embodiment, a translation overlay may be further displayed on the image for receipts that are not in the user native tongue.

The user may click on one of the highlighting boxes associated with a candidate value for a key to select it instead of the one that is associated with the highest score in the description file or to alternatively confirm the candidate value associated with the highest score. This may result in an update of the verification form displayed in the third part 52 of the dedicated area 5 of application interface 150 and/or in an update the scoring of the candidate value, which may involve color change of highlighting boxes 53 used for the candidate values determined for the considered key according to the color code.

In some implementations, the application extension 152 may comprise an advancement tracker to enable a user to track the progress of processing of the selected file (not shown). Such tracking can be stored in the application context. If the user stops its activity and subsequently returns to the application extension 152, the user may resume its activity of be informed if some attachments have already been submitted.

The user may iterate the process for each key and correct it if needed. When the verification process is terminated by the user, the user may select the validation button 520 provided in association with the form to trigger submission of the form to the orchestrator device 18.

The orchestrator device 18 may transmit a refined description file 182 (such as a form) to the target data processing device derived from an updated version of the intermediary description file 181 in which the values corrected by the user have been updated. In one embodiment, the refined description file 182 may comprise only one value per key, the value assigned to a key being either the value corrected for this key by the user (manually by direct input or by selecting one of the highlighting values for example) or the value having the highest score if the user did not correct the value or actively confirmed that value.

In one embodiment, the orchestrator device 18 may further transmit a description file 183 to the file processing device 19 derived from an updated version of the intermediary description file 181 or a signal to inform the device 19 that no update has been performed. The description file 183 transmitted to the file processing device 19 may be the same description file as the description file 182 transmitted to the target data processing device 2 or include additional information. This enables collection of machine-learning data by the file processing device 19 for subsequent integration of file attachments and in particular for subsequent mapping and scoring operations performed by the file processing device 19 for such subsequent integration of file attachments.

Figure 7:
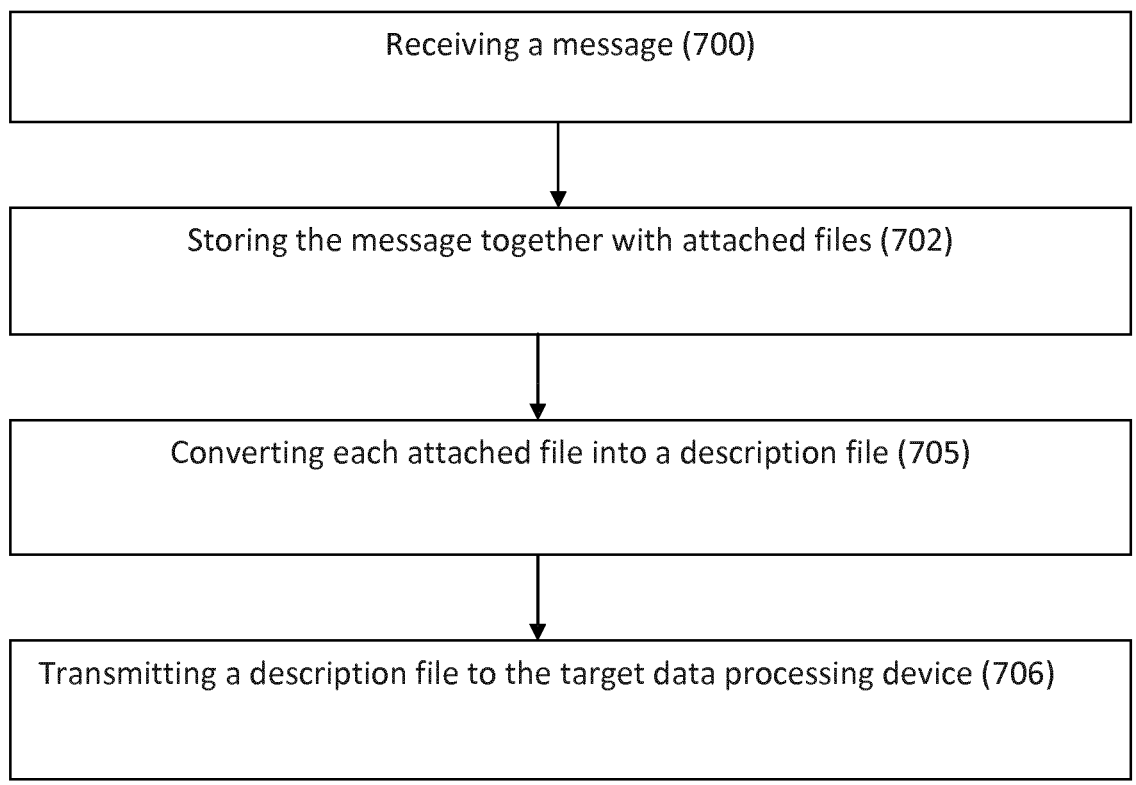
FIG. 7 is a flowchart describing the method of integrating at least one part of message content into a target data processing device, according to some embodiments.

FIG. 7 is a flowchart describing the method of integrating at least a part of received message content into a target data processing device 2, according to some embodiments.

In step 700, an electronic message 12 is received from a messaging client device 14 executing the messaging application 15, the electronic message 12 comprising message content such as one or more files attached 121 to the message 12. The message content (e.g. files) may be related to a given operation or transaction, such as a same expense for an expense reporting implementation of the invention. The following description of certain embodiments of the method will be made with reference to message content represented by files attachments of an email for illustration purpose only.

Each file 121 has a given file format such as pdf, gif, jpeg, etc. Each electronic message may be associated with a message identifier 123.

In step 702, the message 12 may be stored in a database together with the files.

In step 705, each attached file 121 of the message 12 may be converted or transformed into a description file 191 comprising a set of keys, with at least some of the keys are associated with one or more values, such as a JSON file.

In step 706, an extracted input file 182 derived from the description file 191 may be transmitted to the target data processing device 2.

Figure 8:
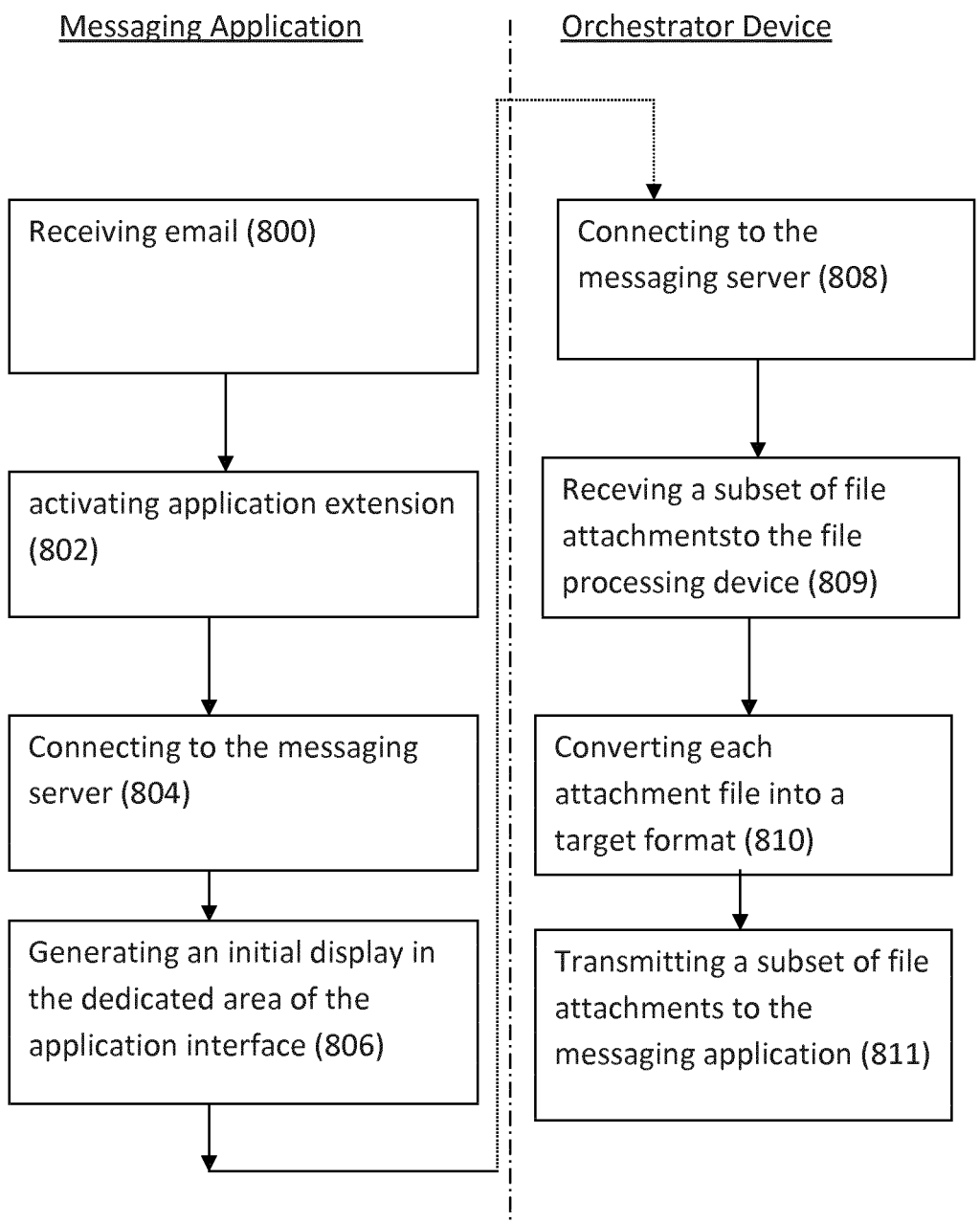
FIG. 8 is a flowchart describing the initialization process performed by the application extension, according to some embodiments.

FIG. 8 is a flowchart describing the initialization process performed by the application extension 152 and the orchestrator device 18, according to some embodiments.

In step 800, an email comprising one or more file attachments 121 may be received, each file attachments having a predefined format (e.g. jpeg, gif, pdf, HTML file).

In step 802, the application extension 152 may be activated, for example in response to the selection of an activation button in the application interface 150. Alternatively, it may be activated dynamically or automatically, based on email or attachment attributes (sender, subject, file format, file size . . . ).

In step 804, the messaging application 15 of the client device may connect to the messaging server 11 in order to require the load of the extension 152.

In step 806, an initialization may be displayed in an opened window or i-frame opened or in a dedicated area 5 of the application interface 150. The initialization view may for example comprise a thumbail for each selected file attachment in the part 51, a view of a first file attachment in the part 50 and an initialization form in the part 52 of the dedicated area 5, the initialization form comprising a set of fields such as for example "date", "country", "address", "sub-type of receipt", "total price", "currency", "expense statement" fields for an expense report application. In one embodiment, the fields of the initialization form may be generated dynamically as a function of initialization data comprising a set of keys extracted from the Target data processing device 2 by the orchestrator device 18 and/or from the sub-type of receipt corresponding to the current file attachment 121 (the one which is displayed in the part 50. Alternatively, the initialization form may be a default form defined by the target processing device 2.

In one embodiment, the orchestrator device 18 may connect in an initial step of the processing to the target data processing device 2 to retrieve a list of the sub-types of file attachments supported by the target data processing device 2 and/or ongoing transactions related to the user in order to dynamically adapt the fields of the form. For example, if the target data processing device 2 is an Expense Reporting Tool, the orchestrator device may comprise retrieving the list of receipt sub-types supported (or needed or configured as required) by the Expense Reporting tool, and/or the set of ongoing Expense Statements for the user.

In step 808, the orchestrator device 18 may connect to the messaging server 11. In alternative embodiments, the orchestrator 18 may be automatically connected to the messaging server 11 without a need to perform a specific step 808.

In step 809, the messaging server 11 may transmit at least a subset of the file attachments 121 to the orchestrator device 18. In one embodiment, the messaging server 11 may only transmit to the orchestrator device the files having a non-structured format among the file attachments 121. In another embodiment, the messaging server 11 may transmit to the orchestrator device 18 all the file attachments 121, the file attachments being then filtered by the orchestrator device 18 to filter only a subset of file attachments according to predefined criteria, the filtering criteria at least comprising filtering the file attachments having a non-structured format among the file attachments 121.

In an expense report application of the invention, each file attachment of the subset may be a receipt (e.g. a photo or the result of a scan) such as a taxi or hotel receipt, or a receipt for non-travel expenses (e.g. a computer, dinner with clients, a batch of photocopies).

In step 810, the orchestrator device 18 may convert each file attachment into a target format for example to provide a file attachment having lowest dimensions and/or weights to optimize their display by the application. For example, a file attachment in PDF format may be converted into a JPEG file.

In step 811, the orchestrator device 18 may send each file attachment in such target format to the messaging application 15 running on the client device 14.

The application extension 152 may then display an initialization view in the dedicated area 5 of the application interface 150, the initialization view comprising a display of each file attachment received by the orchestrator device 18 as a thumbnail in the part 51 of the dedicated area, each thumbnail being a clickable image.

The initialization view may for example comprise a thumbnail for each selected file attachment in the part 51, a view of a one of the file attachments in the part 50 and an initialization form in the right part of the dedicated area. The initialization form may comprise a set of fields such as for example "date", "country", "address", "sub-type of receipt", "total price", "currency" fields for an expense report application. In one embodiment, the fields of the initialization form may be generated dynamically as a function of initialization data comprising a set of keys extracted from the Target data processing device 2 by the orchestrator device 18 and/or from the sub-type of receipt corresponding to the current file attachment 121 as displayed in the part 52 of the dedicated area 5. Alternatively, the initialization form may be a default form defined by the target processing device 2. The file attachment displayed in the left part may be selected randomly by the application extension 2, or correspond to the first displayed thumbnail in the middle part of the application interface or correspond to a thumbnail selected by the user in the part 51 of the dedicated area 5 (by a click on it).

The processing of the file attachment displayed in the part 50, by the orchestrator device 18, may be automatically triggered.

Figure 9:
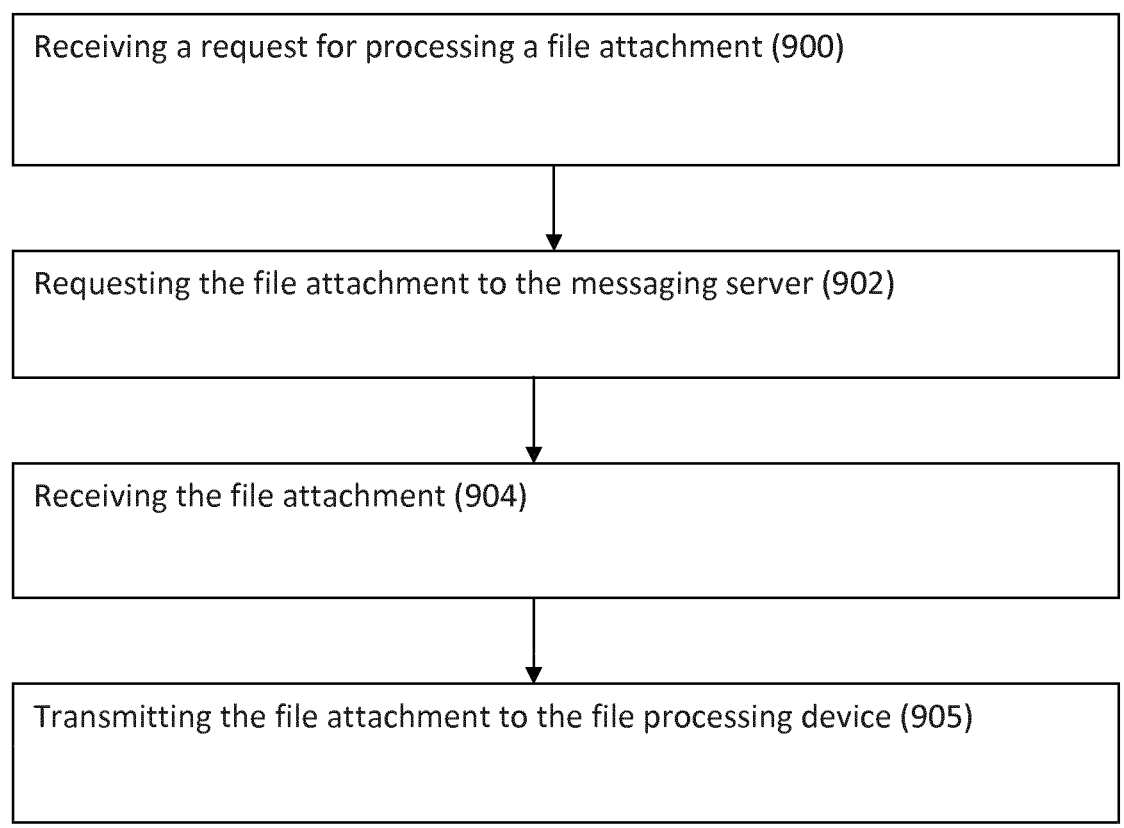
FIG. 9 is a flowchart depicting the process of integrating a file attachment into a target processing device, according to some embodiments.

FIG. 9 is a flowchart depicting the process of integrating a file attachment 121 into a target processing device 2 performed by the orchestrator device 18, according to some embodiments.

In step 900, the processing of a current file attachment is requested by the application, for example in response to the selection of a file in the part 51 of the dedicated area or automatically by selection of a file by the application extension 152 or by the orchestrator device 18.

In step 902, for the current file attachment, the orchestrator device 18 may request the corresponding attachment file to the messaging server 11 if the orchestrator device 18 did not previously store it.

In step 904, the orchestrator device 18 receives the corresponding image.

In step 905, the orchestrator device 18 transmits the file attachment to the file processing device 19. In some embodiments, instead of transmitting the file attachment as retrieved from the messaging server 11 or from a memory maintained by the orchestrator device 18, the orchestrator device 18 may previously apply a pre-processing to the retrieve image to adapt its format or quality.

Figure 10:
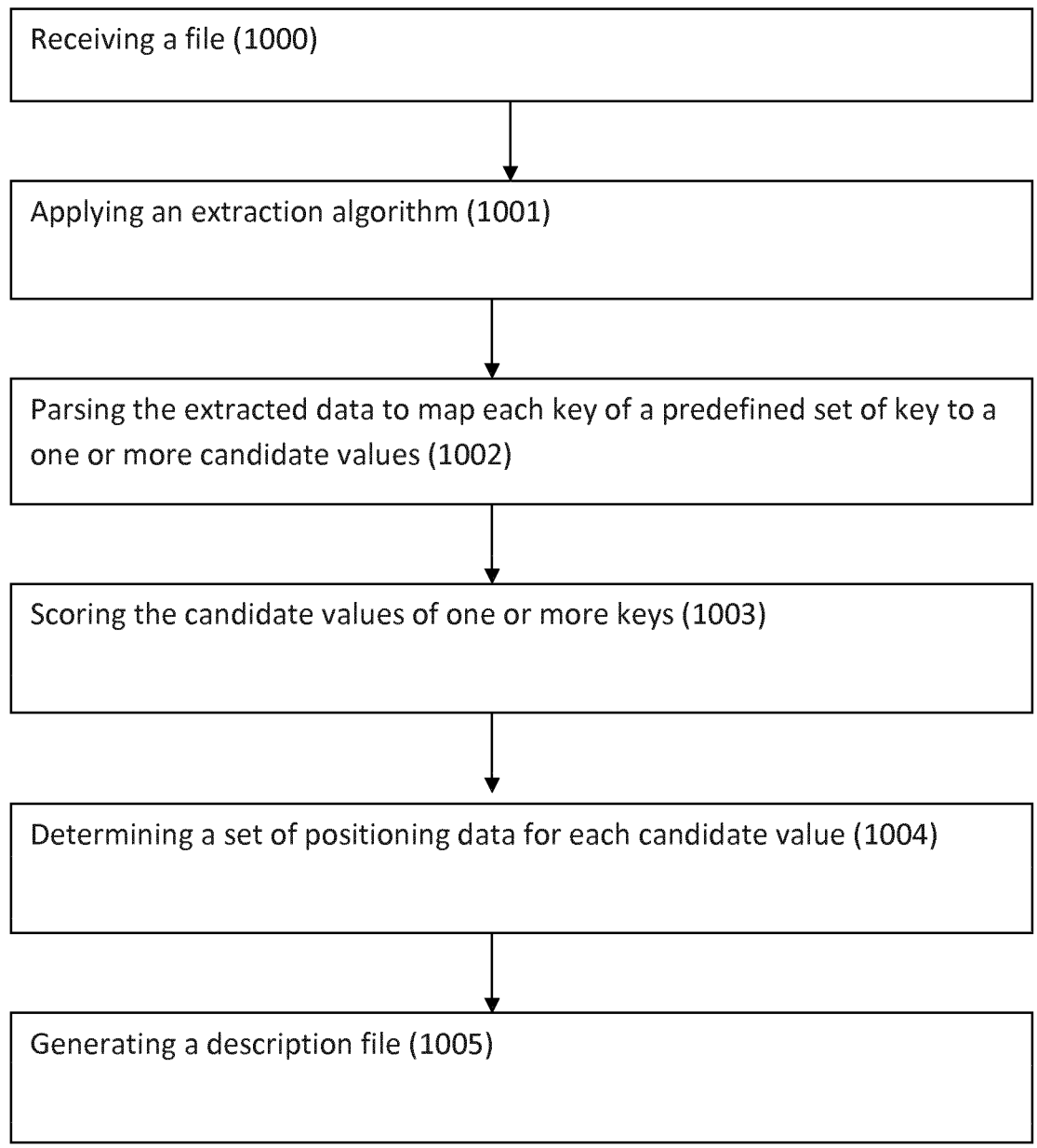
FIG. 10 is a flowchart depicting the process implemented by the file processing device, according to some embodiments.

FIG. 10 is a flowchart depicting the process implemented by the file processing device, according to some embodiments.

In step 1000, a file attachment in a format supported by the file processing device is received from the orchestrator device 18 (e.g. pdf, image format). In some embodiments, the file attachment 190 may be pre-processed to optimize its processing.

In step 1001, at least an extraction algorithm, such as OCR, is applied to the file attachment to extract the characters and/or positioning data from the file 190.

In step 1002 to 1005, the data extracted from the file attachment are parsed and structured into a description file according a predefined data structure comprising a set of keys.

Specifically, step 1002 may comprise parsing the extracted data to map each key of a predefined set of keys to one or more data items of the data extracted from the received file attachment, each mapped data item representing a candidate value for a key.

Step 1003 may comprise computing a scoring for each candidate value assigned to a key.

In some embodiments, the mapping step and or the scoring step may be performed using machine-learned data.

In one embodiment, step 1004 may comprise computing a set of positioning data for each candidate value determined for one or more keys, the set of positioning data determined for a given candidate value representing the position of the candidate value in the file attachment. The positioning data determined for a given data item may include coordinates in a given referential defined with respect to the non editable file.

In step 1005, the description file as generated may be returned to the orchestrator device 18.

FIG. 11 is a view of an extract of an exemplary description file 190 in Json format (pseudo code)

As shown, the description file 190 comprises a set of keys, each having one or more candidate values determined by the file processing device 19, each candidate value being associated with a scoring representing the relevance level of the candidate value determined by the file processing device. Each key is further associated with a set of positioning data representing the position of the corresponding data item in the original file attachment 121.

Figure 12:
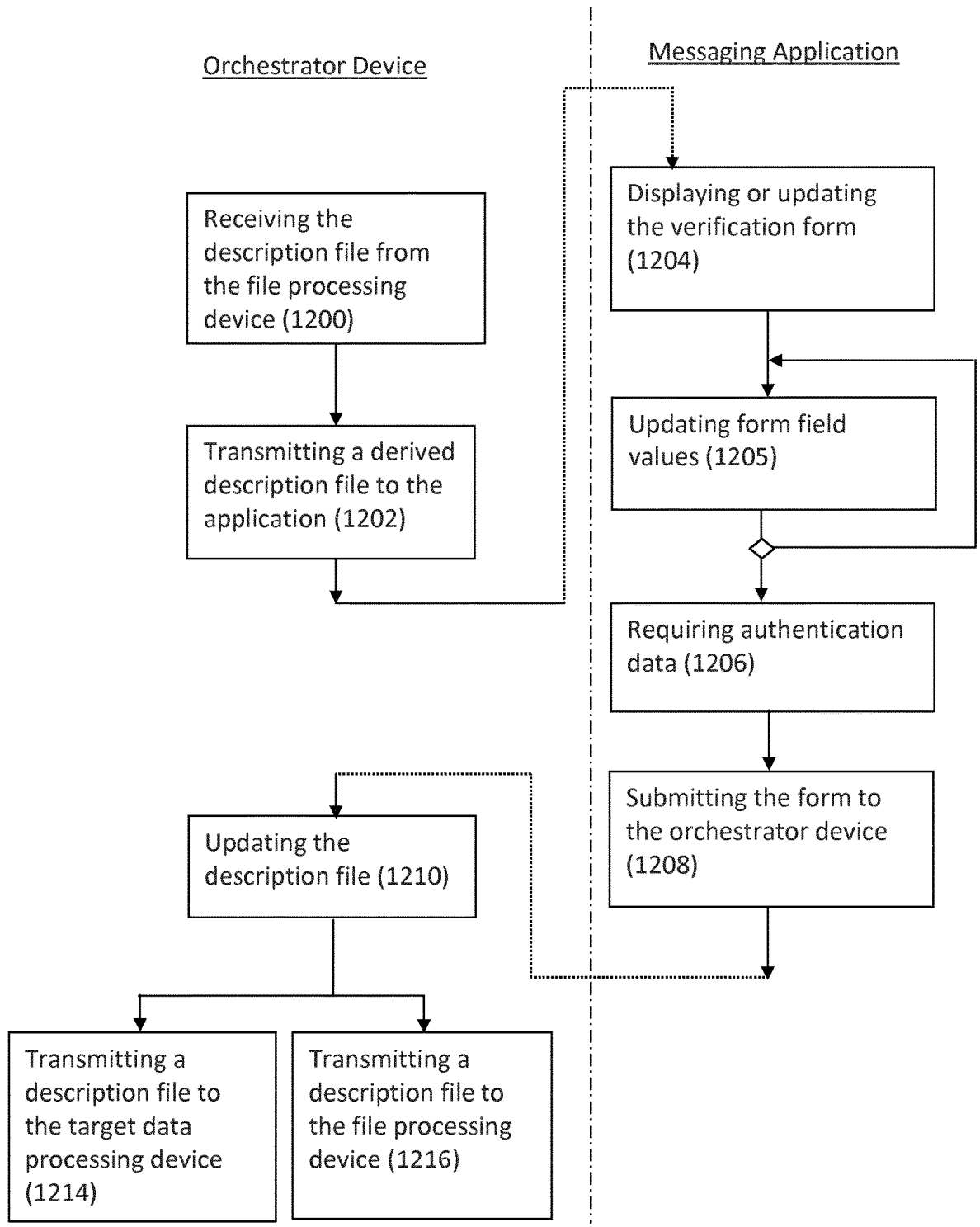
FIG. 12 is a flowchart depicting the process of refining the description file in some embodiments.

FIG. 12 is a flowchart depicting the process of refining the description file, according to some embodiments.

In step 1200, the description file 191 is received by orchestrator device 18 from the file processing device 19.

In step 1202, a description file 181 derived from the description file 191 may be transmitted from the orchestrator device 18 to the application 15 of the client device 14 (the description file 181 may be the description file 191 itself, or a transformed version of the description file 191). In some embodiments, the corresponding file attachment 121 may be simultaneously transmitted to the application.

In step 1204, a display of the description file 181 may be generated by the application extension 152 in the form of the verification form, in the part 52 of the dedicated area 5. The corresponding file attachment 121 (e.g. receipt) may displayed as an image in the part 50 of the dedicated area 5 to enable verification by the user if it has not been displayed during the initialization phase. The form comprises a set of fields, each field corresponding to a key of the description file. If an initial view of the form was displayed at the launch of the application extension 152, the fields of the form may be updated from the content of description file 181 in step 1204. For each form field, the candidate value having the highest scoring for the key corresponding to the form field in the description file 181 may be assigned to the field value. In some embodiments, the other candidate values may be highlighted or displayed using visual elements in the dedicated area to highlight the relevance of the candidate value from the scoring determined for that value. In one embodiment, the visual elements may be the clickable highlighting boxes 55 superposed directly to the image representing the file attachment in part 50 of the dedicated area 5, the position of the highlighting boxed being determined from the set of positioning data associated with the candidate value in the description file 181.

In step 1205, the application extension may update the value of a given field of the form in part 52 of the dedicated area 5, in response to a selection of another candidate value by the user using the visual elements 55, for example by clicking one of the highlighting box in the part RO of the dedicated area 5 or in response to a correction by the user (by textual input) directly in the verification form displayed in the part 52 of the dedicated area 5. The user may further input values for empty fields if no value has been determined for a key. Step 1205 may be iterated for one or more keys until the user validate the form, for example by clicking on a validation button (520). The user input may also be subject to the same checks as the checks performed by the file processing device 19 for the extracted data. For example, the IBAN number typed by the user will have the same checksum as the one done by the file processing device 19.

In step 1206, the application extension may connect to the messaging server 11 to require authentication data for access to the target data processing device 2, such as a password and a login, in embodiments where such authentication data are stored in the messaging server 11 or in an external database. Alternatively, such authentication data may be requested by the orchestrator device 18 directly.

In step 1208, the form possibly with the authentication data may be submitted to the orchestrator device 18 with the updated field values.

In step 1210, the description file 191 may be updated using the corrected values or by selecting the value having the highest score for each key for which the user did not correct the values, which provides a refined description file.

A description file 182 derived from the refined description file may be generated by the orchestrator device 18. The derived description file 182 (also referred to as a "validated description file") may be the refined description file itself or a transformed version of the description file.

The validated description file 182 may be then transmitted to the target data processing device 2 by the orchestrator device 18 for processing by the target data processing device 2 in step 1212. Step 1214 may comprise further transmitting the original file attachment 121 to the target data processing device 2 in the original format or in the format required by the target data processing device.

In one embodiment, a description file 183 derived from the refined description file may be further transmitted to the file processing device 19 in a format supported by the file processing device to enable collection of meta-learning data by the file processing device 19 in step 1216 (the description file 183 may comprise same content as the description file 182 with the same format or another format or comprise additional data). Such meta-learning data can be used by the file processing device 19 for next transformation of file attachments. The meta-learning data may be used to determine the candidate values. For example, if the receipt is a taxi receipt and one of the keys is the price receipt for a given itinerary from location A to location B, the meta-learning data collected may comprise the average price for this itinerary.

Such feedback collected from the user can be used by the file processing device 19 to determine the accuracy of the data extractions by comparing the file description returned by the file processing device to the file description refined by the user. Such meta-learning data may be stored and used for the continued improvement of the system. Using the stored feedback data, the file processing device 19 may be continuously re-trained. For example, in order to re-train the "amount key scoring" component of the scoring determination unit 197, feedback from the result storage, together with the intermediate results that are used to generate the amount properties in the amounts-scoring component may be collected. The amounts-scoring component may be re-run and its results compared with the feedback data. If there are differences, the weights used in the amount-scoring component may be updated.

In an application to expense reporting or management, the target data processing device 2 (Expense Reporting/management tool) may accordingly manage the receipts to submit a request for reimbursement for the user, after checking the validity of the expense (for example if it is associated with an existing trip) and/or its unicity (for example, if two users submitted the same receipt). In one embodiment, such target data processing device 2 may return a feedback to the user through the orchestrator device 18 for example to indicate that an expense corresponding to a processed receipt is being processed, and/or a request for reimbursement has been triggered, and/or that the transmitted receipt triggered a validity or unicity error.

It should be noted that, although certain technical aspects of the invention have been described in combination, they can be used separately in certain applications. In particular, while the file processing device has been described in connection with the use of a messaging application, the skilled person will readily understand that in some embodiments the file processing device 19 can be used independently to convert a non-structured input file such as an image or a pdf file into a structure description file.

Embodiments of the invention may be implemented by a computing system comprising one or more networked computers or servers.

Figure 13:
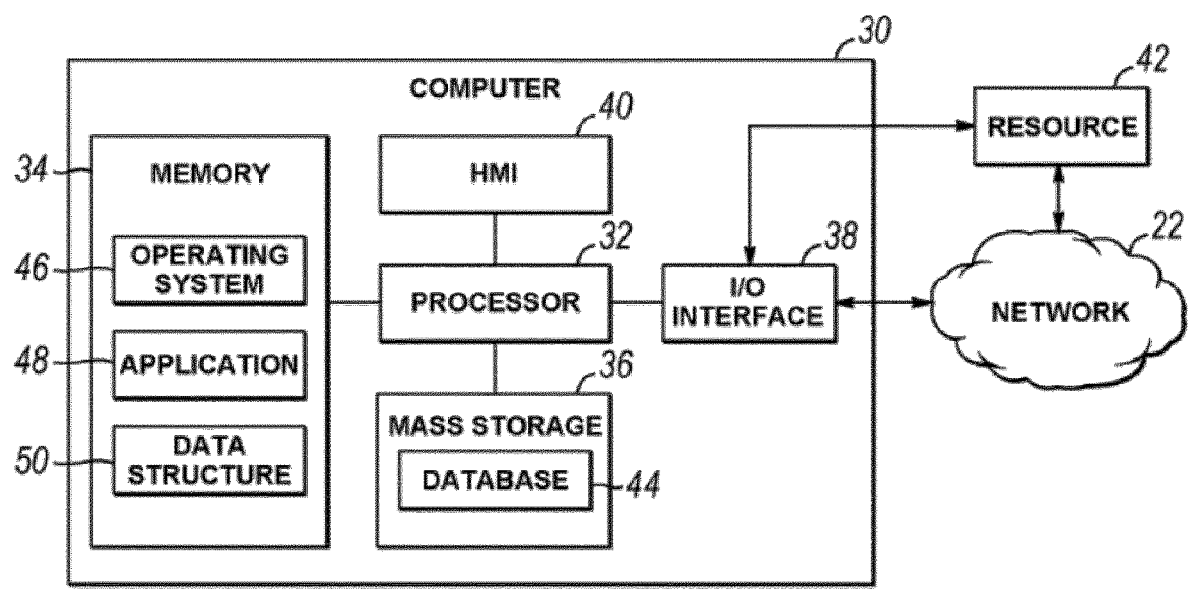
FIG. 13 is a diagram of a computing device or system.

Referring now to FIG. 13, the client device 14, the messaging server 11, the orchestrator device 18, the file processing device 19, the target processing device may be implemented on one or more computing devices or systems, referred to collectively as a computer, such as computer 30. The computer 30 may include a processor 32, a memory 34, a mass storage memory device 36, an input/output (I/O) interface 38, and a Human Machine Interface (HMI) 39. The computer 30 may also be operatively coupled to one or more external resources 42 via the network 6 and/or I/O interface 38. External resources may include, but are not limited to, servers, databases, mass storage devices, peripheral devices, cloud-based network services, or any other suitable computing resource that may used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, non-volatile solid state device, or any other device capable of storing information. A database 44 may reside on the mass storage memory device 36, and may be used to collect and organize data used by the various systems and modules described herein.

Processor 32 may operate under the control of an operating system 46 that resides in memory 34. The operating system 46 may manage computing resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 49 may also reside in memory 34, and may be used by the processor 32, operating system 46, and/or application 48 to store or manipulate data.

The I/O interface 38 may provide a machine interface that operatively couples the processor 32 to other devices and systems, such as the network 6 and/or external resource 42. The application 48 may thereby work cooperatively with the network 6 and/or external resource 42 by communicating via the I/O interface 38 to provide the various features, functions, applications, processes, and/or modules comprising embodiments of the invention. The application 48 may also have program code that is executed by one or more external resources 42, or otherwise rely on functions and/or signals provided by other system or network components external to the computer 30. Indeed, given the nearly endless hardware and software configurations possible, persons having ordinary skill in the art will understand that embodiments of the invention may include applications that are located externally to the computer 30, distributed among multiple computers or other external resources 42, or provided by computing resources (hardware and software) that are provided as a service over the network 6, such as a cloud computing service.

The HMI 39 (such as HMI 30 in the implementation of FIG. 1 of a user device 3) may be operatively coupled to the processor 32 of computer 30 in a known manner to allow a user of the computer 30 to interact directly with the computer 30. The HMI 39 may include video and/or alphanumeric displays, a touch screen, a speaker, and any other suitable audio and visual indicators capable of providing information to the user. The HMI 39 may also include input devices and controls such as an alphanumeric keyboard, a pointing device, keypads, pushbuttons, control knobs, microphones, etc., capable of accepting commands or input from the user and transmitting the entered input to the processor 32.

The database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, an object-oriented database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules. Although embodiments of the invention may be described herein using relational, hierarchical, network, object-oriented, or other database terminology in specific instances, persons having ordinary skill in the art will understand that embodiments of the invention may use any suitable database management model, and are not limited to any particular type of database.

The program code embodying any of the embodiments of the invention described herein is capable of being individually or collectively distributed as a program product in a variety of different forms. In particular, the program code may be distributed using computer-readable media, which may include computer-readable storage media and communication media. Computer-readable storage media, which are inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer-readable instructions, data structures, or other program modules. By way of example, and not limitation, communication media may include wired media such as a wired network or direct-wired connection, and wireless media such as acoustic, RF, infrared and other wireless media. Combinations of any of the above may also be included within the scope of computer-readable media.

The methods described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In addition, program code described herein may be identified based upon the application or software component within which the program code is implemented in a specific embodiment of the invention. However, it should be appreciated that any particular program nomenclature that follows is used merely for convenience, and thus the invention should not be limited to use solely in any specific application identified and/or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described.

The invention claimed is:

1. A system for integrating message content into a target data processing device, the target data processing device being configured to process an input data having a predefined data structure, the system comprising:
 a messaging server configured to receive a message from a messaging client device executing a messaging application at the target data processing device, the message comprising the message content, wherein the messaging application comprises an application interface and an application extension;
 a file processing device; and
 an orchestrator device configured to:
  integrate a part of the message content into the target data processing device;
  receive the part of the message content from the messaging server, wherein the part of the message content comprises one or more file attachments;
  extract a non-structured file from the part of the message content;
  transmit the non-structured file to the file processing device;
  derive, from a description file, an input file having the predefined data structure;
  transmit the input file to the target data processing device for processing; and
  provide an initialization view in a dedicated area of the application interface, the initialization view comprises a display of the one or more file attachments received by the orchestrator device as a thumbnail that is a clickable image;
 wherein the file processing device is configured to:
  determine whether the part of the message content is similar to one or more reference documents by comparing a set of attributes associated with at least the non-structured file from the part of the message content with a set of attributes from the one or more reference documents;
  in response to a determination that the part of the message content is similar to the one or more reference documents, determine a feature vector using transformations and filters applied to the part of the message content;
  extract a file type based on the feature vector;
  transform the non-structured file into the description file comprising a set of predefined keys based on the file type, at least some of the predefined keys being associated with one or more values; and
  transmit the description file to the orchestrator device, wherein the target data processing device is configured to generate, by the application extension, a rendering of the input file and the initialization view in the dedicated area of the application interface.

2. The system of claim 1, wherein the orchestrator device is connected to the messaging server according to a first communication protocol, to the messaging application according to a second communication protocol, and to the target data processing device according to a third communication protocol.

3. The system of claim 1, wherein the application extension is further configured to display an image of the part of the message content in the dedicated area and to generate a display of one or more selectable highlighting items for each data item of the part of the message content mapping a key, and each highlighting item for a given data item is displayed at a position of the displayed image determined from a set of positioning data identifying the position of the data item.

4. The system of claim 1, wherein the file processing device is configured to map one or more data items of the part of the message content to at least some keys of a predefined set of keys, the file processing device is configured to generate the description file from the part of the message content, the description file comprises the set of predefined keys, and the one or more values associated with the keys of the description file are derived from the one or more data items mapped thereto.

5. The system of claim 4, wherein the file processing device is further configured to determine sets of positioning data from the input file received from the orchestrator device, each set of positioning data identifies a position of a data item of the input file mapping a key of the predefined set of keys, and each set of positioning data is included in the description file being associated with the key mapped to the data item.

6. The system of claim 5, wherein each set of positioning data includes positioning coordinates in a given referential.

7. The system of claim 4, wherein the file processing device is further configured to determine a scoring for each value associated with a given key of the predefined set of keys, and the file processing device is further configured to include the scoring determined for the value associated with the given key in the description file.

8. The system of claim 1, wherein the application extension comprises an advancement tracker, and the advancement tracker is configured to track a progress of processing of a selected file.

9. The system of claim 1, wherein the dedicated area of the application interface is managed by the application extension, and the dedicated area of the application interface comprises at least one graphical element.

10. A method of integrating message content into a target data processing device, the target data processing device being configured to process input data having a predefined data structure, the method comprising:
  receiving, by a messaging server, a message from a messaging client device executing a messaging application at the target data processing device, the message comprising the message content, wherein the messaging application comprises an application interface and an application extension and the message content comprises one or more file attachments;
  integrating, by an orchestrator device, a part of the message content into the target data processing device by:
    extracting, by the orchestrator device, a non-structured file from the part of the message content;
    transmitting the non-structured file from the orchestrator device to a file processing device;
    determining whether the part of the message content is similar to one or more reference documents by comparing a set of attributes associated with the part of the message content with a set of attributes from the one or more reference documents;
    in response to a determination that the part of the message content is similar to the one or more reference documents, determining a feature vector using transformations and filters applied to the part of the message content;
    extracting a file type based on the feature vector;
    transforming, by the file processing device and based on the file type, the non-structured file into a description file comprising a set of predefined keys, at least some of the predefined keys being associated with one or more values;
    transmitting, by the file processing device, the description file to the orchestrator device;
    deriving, from the description file and by the orchestrator device, an input file having the predefined data structure; and
    transmitting the input file to the target data processing device for processing;
  generating, at the target data processing device by the application extension, a rendering of the input file and an initialization view in a dedicated area of the application interface; and
  providing the initialization view in the dedicated area of the application interface, the initialization view comprises a display of the one or more file attachments received by the orchestrator device as a thumbnail that is a clickable image.

11. The method of claim 10, wherein the orchestrator device is connected to the messaging server according to a first communication protocol, to the messaging application according to a second communication protocol, and to the target data processing device according to a third communication protocol.

12. The method of claim 10, wherein the application extension is further configured to display an image of the part of the message content in the dedicated area and to generate a display of one or more selectable highlighting items for each data item of the part of the message content mapping a key, and each highlighting item for a given data item is displayed at a position of the displayed image determined from a set of positioning data identifying the position of the data item.

13. The method of claim 10, wherein the file processing device is configured to map one or more data items of the part of the message content to at least some keys of a predefined set of keys, the file processing device is configured to generate the description file from the part of the message content, the description file comprising the set of predefined keys, and the one or more values associated with the keys of the description file are derived from the one or more data items mapped thereto.

14. The method of claim 13, wherein the file processing device is further configured to determine sets of positioning data from the input file received from the orchestrator device, each set of positioning data identifies a position of a data item of the input file mapping a key of the predefined set of keys, and each set of positioning data is included in the description file being associated with the key mapped to the data item.

15. The method of claim 14, wherein each set of positioning data includes positioning coordinates in a given referential.

16. The method of claim 13, wherein the file processing device is further configured to determine a scoring for each value associated with a given key of the predefined set of keys, and the file processing device is further configured to include the scoring determined for the value associated with the given key in the description file.

17. The method of claim 10, wherein the application extension comprises an advancement tracker, and the advancement tracker is configured to track a progress of processing of a selected file.

18. The method of claim 10, wherein the dedicated area of the application interface is managed by the application extension, and the dedicated area of the application interface comprises at least one graphical element.

19. The method of claim 10, wherein the file type is extracted based on a machine learning algorithm configured to determine one or more properties of the non-structured file based on the feature vector.

20. A computer program product comprising:
  a non-transitory computer readable storage medium; and
  instructions stored on the non-transitory computer readable storage medium that, when executed by a processor, cause the processor to integrating message content into a target data processing device, the target data processing device being configured to process input data having a predefined data structure, the processor being further caused to:
    receive a message from a messaging client device executing a messaging application at the target data processing device, the message comprising the message content, wherein the messaging application comprises an application interface and an application extension and the message content comprises one or more file attachments;
    integrate a part of the message content into the target data processing device by:
      extract a non-structured file from the part of the message content;
      transmit the non-structured file;
      determine whether the part of the message content is similar to one or more reference documents by comparing a set of attributes associated with the part of the message content with a set of attributes from the one or more reference documents;

in response to a determination that the part of the message content is similar to the one or more reference documents, determine a feature vector using transformations and filters applied to the part of the message content;

extract a file type based on the feature vector;

transform, based on the file type, the non-structured file into a description file comprising a set of predefined keys, wherein at least some of the predefined keys are associated with one or more values;

transmit the description file;

derive, from the description file, an input file having the predefined data structure; and transmit the input file to the target data processing device for processing; and provide an initialization view in a dedicated area of the application interface, the initialization view comprises a display of the one or more file attachments received as a thumbnail that is a clickable image, wherein the target data processing device is configured to generate, by the application extension, a rendering of the input file and the initialization view in the dedicated area of the application interface.

* * * * *